(12) United States Patent
Cruz et al.

(10) Patent No.: US 10,497,045 B2
(45) Date of Patent: Dec. 3, 2019

(54) SOCIAL NETWORK DATA PROCESSING AND PROFILING

(71) Applicant: Accenture Global Solutions Limited, Dublin (IE)

(72) Inventors: Nepthalie P. Cruz, Antipolo (PH); Henry Steven T. Sy, Metro Manila (PH); Peter Ruiz, Taguig (PH); Von Rolfe B. Velasco, Metro Manila (PH); Daryl Christian M. Cabacungan, Metro Manila (PH); Richard M. Infantado, Metro Manila (PH)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 553 days.

(21) Appl. No.: 15/229,492

(22) Filed: Aug. 5, 2016

(65) Prior Publication Data
US 2018/0040059 A1  Feb. 8, 2018

(51) Int. Cl.
*G06Q 30/00* (2012.01)
*G06Q 30/06* (2012.01)
*G06Q 50/00* (2012.01)

(52) U.S. Cl.
CPC ..... *G06Q 30/0631* (2013.01); *G06Q 30/0643* (2013.01); *G06Q 50/01* (2013.01)

(58) Field of Classification Search
CPC .................................. G06Q 30/0601–0645
USPC .............................................. 705/26.1–27.2
See application file for complete search history.

(56) References Cited

U.S. PATENT DOCUMENTS

| 7,603,352 | B1 | 10/2009 | Vasallo et al. | |
|---|---|---|---|---|
| 9,262,517 | B2 | 2/2016 | Feng et al. | |
| 2008/0294607 | A1* | 11/2008 | Partovi | G06Q 30/00 |
| 2008/0294622 | A1 | 11/2008 | Kanigsberg et al. | |
| 2009/0271228 | A1* | 10/2009 | Bilenko | G06Q 30/02 |
| | | | | 705/7.29 |
| 2009/0271247 | A1* | 10/2009 | Karelin | G06Q 10/10 |
| | | | | 705/319 |
| 2010/0023506 | A1 | 1/2010 | Sahni et al. | |
| 2010/0119053 | A1* | 5/2010 | Goeldi | G06Q 10/00 |
| | | | | 379/265.09 |

(Continued)

FOREIGN PATENT DOCUMENTS

WO    2013/188815    8/2016

OTHER PUBLICATIONS

Wu, H., & Zha, S. (2014). Insights into the adoption of social media mashups. Internet Research, 24(2), 160-180. doi:http://dx.doi.org/10.1108/IntR-01-2013-0017 (Year: 2014).*

*Primary Examiner* — Resha Desai
*Assistant Examiner* — Kennedy Gibson-Wynn
(74) *Attorney, Agent, or Firm* — Mannava & Kang, P.C.

(57) ABSTRACT

A social network data processing and profiling system generates a customer profile from customer attributes and information regarding the customer's social network profiles on a plurality of virtual social networks. The social network data regarding the customer is received from the plurality of virtual social networks. The received social network data is used to update the customer profile. One or more products from a products database are identified for recommending to the customer based on the customer profile. The identified products are output to a products page associated with the customer.

16 Claims, 13 Drawing Sheets

(56) References Cited

U.S. PATENT DOCUMENTS

| | | | |
|---|---|---|---|
| 2013/0246215 A1* | 9/2013 | Faith | G06Q 30/0631 |
| | | | 705/26.7 |
| 2013/0297619 A1 | 11/2013 | Chandrasekaran et al. | |
| 2014/0195930 A1* | 7/2014 | Rajagopal | G06F 3/0484 |
| | | | 715/753 |
| 2014/0280214 A1* | 9/2014 | Han | G06F 17/30867 |
| | | | 705/14.66 |
| 2015/0100377 A1* | 4/2015 | Penumaka | G06Q 30/0201 |
| 2015/0149321 A1* | 5/2015 | Salameh | G06Q 30/0613 |
| | | | 705/26.41 |
| 2015/0348166 A1* | 12/2015 | Trivedi | G06Q 30/0631 |
| | | | 705/26.7 |
| 2016/0027091 A1* | 1/2016 | McGrath | G06F 17/30867 |
| | | | 705/26.61 |
| 2016/0085865 A1* | 3/2016 | Weingarten | G06N 99/005 |
| | | | 705/26.7 |
| 2016/0232463 A1* | 8/2016 | McDonough | G06Q 10/0633 |
| 2017/0053332 A1* | 2/2017 | Koch | G06Q 30/0631 |
| 2017/0193075 A1* | 7/2017 | Hegelich | H04L 51/16 |

* cited by examiner

700 →

| PΣΣQ | Daryl Christian ▾  🔎 Quick Search |
|---|---|
| ⊙ Dashboard | |

Navigation

✤ Profiles  +

⊙ collapse

News Feeds

○ Adrian has new tweet
  2 min ago

○ Bravo just added mosaicpro
  New employer
  5 min ago

○ Charlie just posted at facebook
  10 min ago

○ Darleen tweeted a new car
  30 min ago

○ Eva just logged in
  35 min ago

LOGO

— 702
704 —
Clark Kho — 706

[ Delete Profile from Database ]

♧ 16    720

[ Contact    722 ]

✉ Contact@mosiacpro.biz
✦ /facebook
Be /user

☐ Matching Products    ☐ Recent Posts    ☐ All Products
                              — 708       — 710           — 712

Matched Products

Credit Card

Housing Loan

Client-Product Analysis — 714

Housing Loan has 1 matched tag/s — 716

( 50% )  Housing Loan

— 718

( 50% )  Credit Card

Credit Card has 1 matched tag/s

- Dashboard
- Navigation
- Profiles
- collapse
- News Feeds
  - Adrian has new tweet
    2 min ago
  - Bravo just added mosaicpro
    New employer
    5 min ago
  - Charlie just posted at facebook
    10 min ago
  - Darleen tweeted a new car
    30 min ago
  - Eva just logged in
    35 min ago
- Filter
  - Work Related
  - Very Important
  - Family & Friends Steven ▾  Quick Search  ☐☐☐☐☐

All ▾

New Message from Jonathan

1102 Adrian Dela Fuente
Management Consulting
Software Engineer Associate Manager - Accenture Inc.
Stanford University About
Email: xxxx@gmail.com
Email: xxxx@yahoo.com
Facebook: xxx
Twitter: @abc
Phone: 1234123412

Recent Photos  1110  1112

1104 Adrian Delos Reyes
Human Resources
Technical Recruiter – RCG Global services
Harvard University About
Email: yyy@gmail.com
Email: yyyy@yahoo.com
Twitter: @yyy
Phone: 1234123412

Recent Photos  1114

Follow

1106 Adrian Kuzmach
Marketing SEO Specialist - One Palm Marketing
Marketing  SEO Specialist – One Palm Marketing
Asian College of Science and Technology About
Email: zzz@gmail.com
Facebook: zzz
Twitter: N/A
Phone: 1234123412

Recent Photos  1116

Follow

Lockhost81/firstinnovation/webapp/dashboard.html

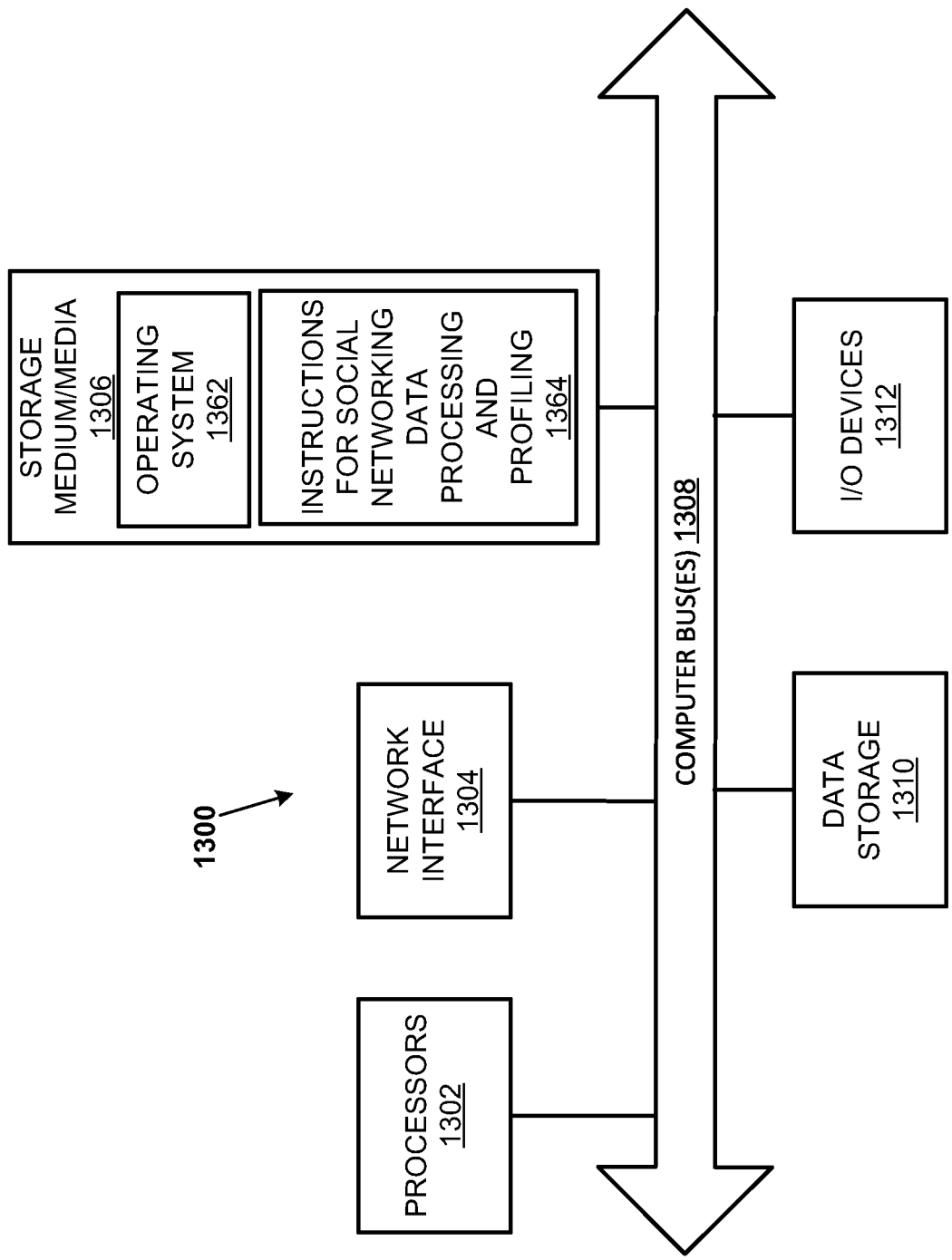

SOCIAL NETWORK DATA PROCESSING AND PROFILING

BACKGROUND

A social network is a social structure that involves people who may have social contacts with each other. With the advent of the Internet and mobile computing devices, social networks are also virtualized in that people exchange their contact information such as email addresses, mobile telephone numbers or user IDs for a social networking website to form groups within a virtual social network. A person may therefore come into contact with other people who they may know or not know in the real-world via the virtual social network. The public or private groups thus formed within the virtual social network enables people to exchange online text, audio or video messages. Different types of social networks are established that cater to different interests people may have. Some social networks such as FACEBOOK may be established for forming groups between family and friends and exchanging personal information. Some social networks such as LINKEDIN may be formed for establishing professional contacts and groups between people based on their business or professional lives. The user data thus gathered is used by the social networks for marketing products from various business concerns.

BRIEF DESCRIPTION OF DRAWINGS

Features of the present disclosure are illustrated by way of examples shown in the following figures. In the following figures, like numerals indicate like elements, in which:

FIG. 7 is an illustration that shows an example of a customer profile user interface pertaining to the customer profile that is stored by the profiling system in the profiles database;

FIG. 8 is an illustration that shows an example of the recent posts tab of the customer profile user interface;

FIG. 10 is an illustration that shows an example results display of a search for a customer within the profiles database;

FIG. 11 illustrates a screen that shows various customer profiles that include image data;

FIG. 13 illustrates a computer system that may be used to implement one or more of the profiling system or a user device.

DETAILED DESCRIPTION

Figure 1:
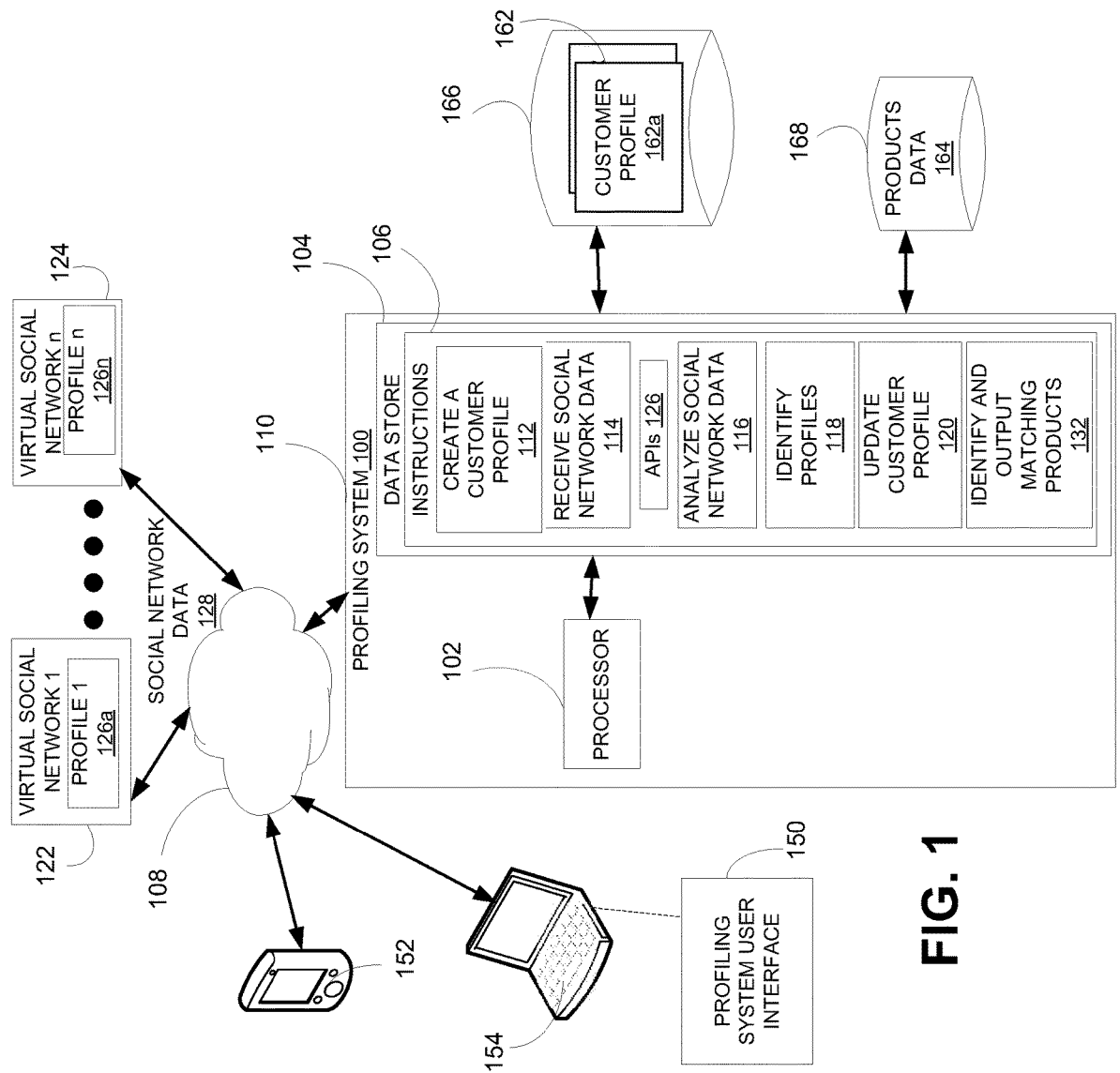
FIG. 1 is an example of a social network data processing and profiling system.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A social network data processing and profiling system or a social profiling system is disclosed which enables matching customers to products based on their social network data. In order to find matching products, a customer profile is initially built within the social profiling system in a profile database. The customer profile can be automatically updated over time in response to changes in status and other information posted by the customer to one or more social networks communicatively coupled to the profiling system. The customer profile may include personal attributes of the customer such as the customer's demographic information, location, employer or other details from the customer's personal and professional lives that is provided by the customer or otherwise automatically obtained from publicly available data sources. The publicly available data sources can include but are not limited to the customer's social network profiles that exist on the various virtual social networks in which the customer marks particular information as public or search engines which freely provide certain customer attributes to the public. The customer profile may also include the information that the customer shares publicly such as stories, jokes, news articles, images or video or tweets and the like. The automatic updates to the customer's profile includes changes to the customer's attributes or any new information that the customer may publicly share.

A products database which includes data regarding the various products is also coupled to the profiling system. In an example, the products relate to a financial institution and may include without limitation, loans, insurances, banking services for people and businesses, brokerage facilities and the like. The customer profile is analyzed along with the product data to identify particular products that match the customer profile. Based at least on the analysis of the customer profile and the product information, information regarding the particular products is provided to the customer. In an example, a user interface may be provided by the profiling system that dynamically displays the matching product information associated with the customer profile. Thus, when the customer profile changes with any updates from the social networks, the updates may be analyzed along with the product data to identify any new products that may interest the customer in view of the updated customer profile. Similarly, when a new product is added to the product database, the customer profiles from the profile database may be analyzed to identify those customers who may be interested in the new products so that the information regarding the new products may be communicated to such interested customers.

In an example, text analysis methods are used to analyze the textual data within the customer profile that was obtained from the customer's social network data in order to identify the matching products. The textual data can include without limitation the customer's attributes or other information that is publicly shared by the customer. One or more of audio, image and video data included in the customer's profiles may be included on one or more of the social networks. In an example, the tags or keywords associated with the images, comments for the images can be analyzed using textual analysis techniques such as but not limited to pattern matching in order to identify matching products. In another example, image analysis algorithms which enable automatic object recognition from images may also be used for obtaining information from the images and used to identify relevant products.

The social network data from the plurality of virtual social networks is obtained from respective API (Application Programming Interfaces) provided by each of the plurality of virtual social networks in one example. The API of a virtual social network can be configured to provide a data type associated with the virtual social network. For example, certain virtual social networks allow their users to send short text messages which may have a limited number of characters. The API of such as virtual social network may be configured to provide brief textual data. Another virtual social network may allow users to post images and the API of that virtual social network may be configured to provide image data. Similarly, APIs of different virtual social networks may be configured to provide different types of data available and posted by the users on the social network. In an example, the profiling system has its API to pull data from the various virtual social networks.

In an example, the profiling system may include a user interface that allows a user of the profiling system to create the customer's profile, view the updates that automatically occur on the customer's profile and view the products that match a current customer's profile. The information displayed within the user interface that shows the customer profile may include the customer's attributes, the information posted by the customer which may include stories or news articles shared by the customer, images publicly posted by the customer and the like. The user interface may be accessible to authorized users and particular screens or displays may be shown to specific users. In an example, the user interface may also display a current status of the customer on one or more of the various virtual social networks that are communicatively coupled to the profiling system. The user interface may include a search box that allows users to search for profiles of specific customers in the profile database, for example, using their first or last names.

As mentioned above, the advent of the Internet and the proliferation of mobile devices led to the development of different social networking systems that allow users to exchange data of various data formats. The profiling system detailed herein solves the technical problem of extracting different types of data from the plurality of virtual social networks, matching it to the product information and automatically selecting products to recommend. Moreover, new data is constantly generated and the profiles of customers on the virtual social networks are updated almost every day. When the introduction of new products routinely by an organization is also considered, the product recommendations tend to get outdated very quickly. The automatic updates feature included in the profiling system enables maintaining the latest customer profiles in the profiles database which in turn are used to automatically update product recommendations. This prevents the product recommendations from becoming outdated or irrelevant to the customers' interests.

FIG. 1 is an example of a social network data processing and profiling system 100. The profiling system 100 may include machine-readable instructions 106 stored in a non-transitory data store 104 that can be executed by a processor 102 of a computing apparatus 110. In an example, the data store 104 executes creating instructions 112 for allowing a user to create a customer profile 162a which may be one of a plurality of customer profiles 162 generated within the profiles database 166. Brief data regarding a customer such as one or more of a customer's first name, last name, email address, contact phone number or address may be entered by a user of the profiling system 100 to initially create a customer profile 162a. In an example, the customer profile 162a may also include identification data such as the userID of the customer on one or more of the plurality of virtual social networks 122-124. A respective customer profile may thus be created and stored in the profiles database 166 for each customer of interest to the users of the profiling system 100. As the customer profile 162a includes the social network identification data, the customer profile 162a can be automatically updated in response to receiving social network data regarding the customer from the one or more of the virtual social networks 122-124.

Accordingly, the machine-readable instructions 106 may include receiving instructions 114 that cause the profiling system 100 to receive social network data 128 regarding users of a plurality of virtual social networks 122-124 via for example, the internet 108. The social network data 128 regarding the customers may be the data from the respective social network profiles 126a, . . . 126n on the plurality of virtual social networks 122-124 which the customers opt to make publicly available. Such publicly available data may include without limitation, user attributes, the data or messages exchanged by the users, their interests, images or other content generated and posted publicly by the users or their social contacts using end user devices 152, 154. In an example, the social network data 128 can be accessed by the profiling system 100 using respective APIs made available by the various virtual social networks 122-124. In another example, the social network data 128 can be received using the profiling system APIs 126 which can be configured to access various types of data provided by the different virtual social networks 122-124. In an example, the receiving instructions 114 are configured to receive the social network data 128 either periodically or when the changes to the customers' social network profiles are pushed by the respective virtual social networks 122-124.

The data store 104 further includes analyzing instructions 116 that are executed by the processor 102 to analyze the social network data 128 received from one or more of the virtual social networks 122-124. Analysis of the social network data enables the processor 102 to identify one or more customers associated with the received social network data 128 and the information conveyed by the social network data 128. As mentioned above, the social network data 128 can include a plurality of data types such as text, images or other audio, video information posted by the customer or otherwise associated with the customer that is made available to the public. The instructions for analyzing the social network data 128 may thus cause the processor 102 to execute text matching algorithms to identify attributes such as the names of customers from the profiles database 166 within the social network data 128. Similarly, image recognition algorithms may also be executed on image data included in the social networking data 128 to recognize particular customers or other entities included therein. In an example, the results of the analysis of the text data and the image data may be used in conjunction to identify the information regarding a customer that is available within the social network data 128.

Based on the analysis, the processor 102 therefore executes identification instructions 118 to identify respective customer profile(s) in the profiles database 166 for customer(s) included in the social network data 128. When one or more of the customer profiles 162 in the profile database 166 are determined as being associated with the customer(s) included in the social network data 128, the customer profile(s) 162 may be updated by the processor 102 with the information from the social network data 128 via executing the update instructions 120. The update instructions 120 therefore enable the processor 102 to store information regarding customers from the social network data 128 to their respective customer profiles on the profile database 166.

The product matching and output instructions 132 are executed by the processor 102 to automatically identify products data 164 from the products database 168 that match the customer profile 162a. In an example, the products data 164 may include information regarding products which are associated with a financial institution such as, loans, business services, insurance products or brokerage services and the like. Text matching algorithms may be further employed as will be detailed further infra to identify particular products that match the customer profile 162a updated with the social network data 128. The products which match the customer profile 162a are output to the users of the profiling system 100 on a user interface 150. Each time at least one of the customer profiles 126a-126n is changed, the social network data 128 regarding the change is received by the profiling system 100 and the matching products on the user interface 150 may be altered to suit the customer's requirements.

Figure 2:
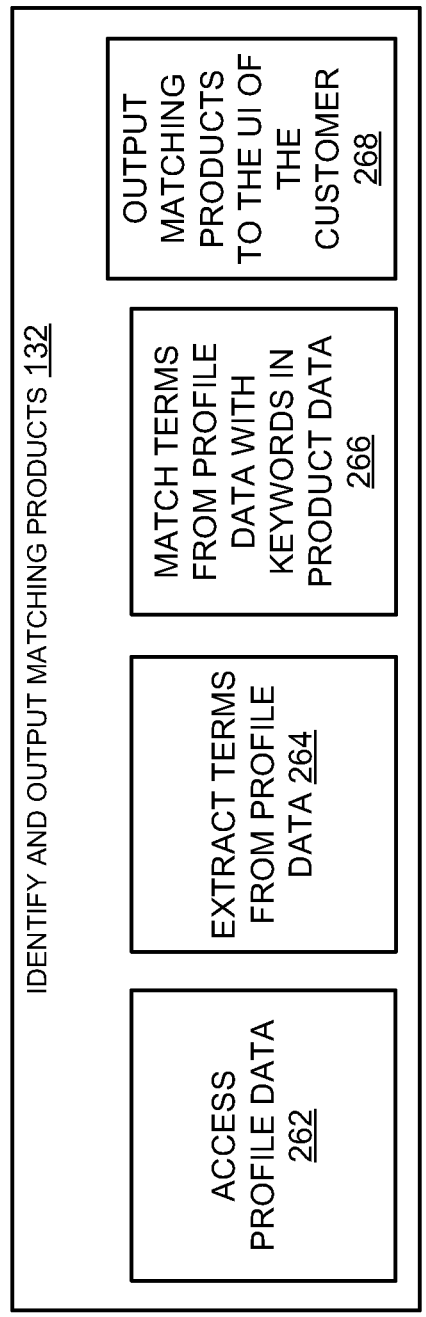
FIG. 2 is a block diagram that displays details of the instructions to identify and output matching products executed by the profiling system.

FIG. 2 is a block diagram that displays details of the instructions to identify and output matching products 132 executed by one example of the profiling system 100. In order to identify products that match the user's profile 162a, the processor 102 executes instructions to access 262 the customer profile 162a from the profiles database 166. The customer profile 162a may include data which customers make public via their respective social network profiles 126a-126n on the various virtual social networks 122-124. The public data may include but is not limited to attributes of the customers, their location information, images posted to the virtual social networks, information shared with the public such as links of content items such as articles or news stories that may be shared, quotations forwarded or posted on the public profile and the like.

Upon accessing the customer profile 162, the processor 102 executes instructions to extract terms 264 from the customer profile 162 via pattern matching techniques or image analysis techniques or other content analysis techniques that are currently know or to be invented. For textual data included in the customer profile 162a, pattern matching techniques may be used to extract nouns, adjectives or other parts of speech and to delete the stop words. When the data includes image data, text associated with the images such as the image tags, comments or textual output from image recognition algorithms identifying entities in the images may also be analyzed to extract terms. When the term extraction from the customer profile 162a is completed, the processor 102 executes instructions 266 to match the extracted terms from the profiles with keywords in the products data 164 from the product database 168. The products data 164 may relate to the products of a financial institution and may include without limitation identification and description of specific product, links to the detail pages or FAQs regarding the products, contact information for people managing the products and the like. Various keywords may be predetermined and stored within the information associated with the products so that the relevant products may be automatically matched to the customer profiles 162. For example, if the customer profile 162a includes a short message from the social network data 128 of a customer that says "Looking for a new car", products related to a new car purchase, such as a car loan, may be matched to the customer profile 162a based on their attributes and description in the products data 164. The product information associated with the matched keywords is output by the processor 102 to a user interface of the profiling system 100 via executing the instructions 268. The users of the profiling system 100 may access the user interface via one of the user devices 152, 154 to provide the information from the products data 164 to the customer corresponding to the customer profile 162a. The information regarding the matching products may be provided to the customer via various modalities such as but not limited to email, SMS (Short Messaging Service), a telephone, in a personal meeting, mailing a hard copy and the like.

Figure 3:
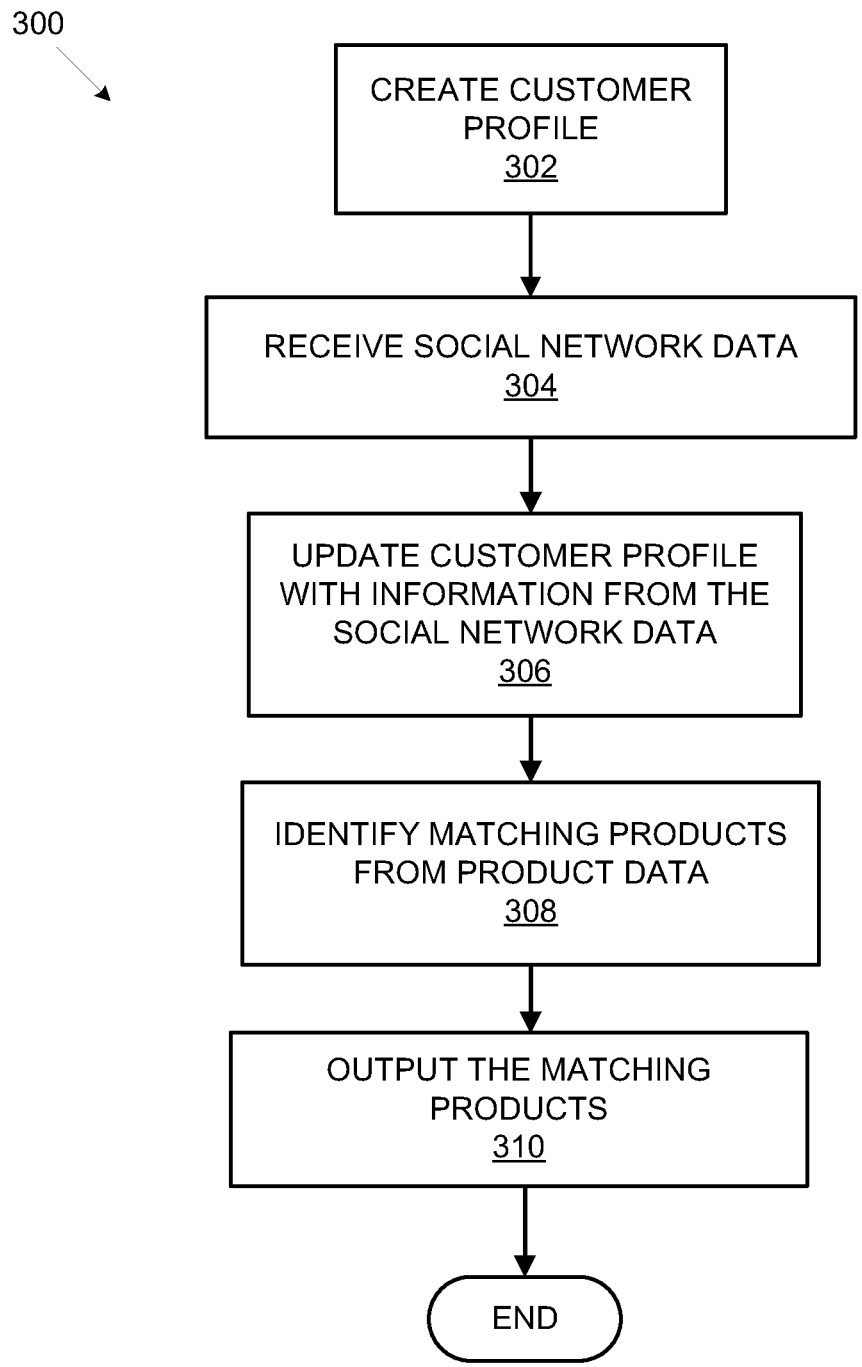
FIG. 3 is a flowchart that details an example method of matching products to customer profiles.

FIG. 3 is a flowchart 300 that details an example method of matching products to customer profiles. The method begins at block 302 wherein the processor 102 executes instructions for creating the customer profile 162a from received customer data. The customer data may be entered by a user of the profiling system 100 or it may be loaded from a local or remote data source. In addition to the customer attributes, the customer data can include information regarding the virtual social networks that may be used to gather the social network data 128 such as the identity of the virtual social networks on which the customers may have their information. The customer profile 162a is created from the customer data provided and stored to the profile database 166. At block 304, the processor 102 begins to receive the social network data 128 based on the customer data that was provided at block 302. In an example, the social network data 128 can include updates or changes to the customer profiles 126a-126n on the various virtual social networks. The updates may relate to new messages including text or images that are posted by the customer on his/her social network profile, status updates such as admission into college, change of job, a promotion, expansion of the family such as birth of a child, property transactions such as buying or selling a home or vehicle and the like. The social network data 128 is stored or updated to the customer profile 162a in the profile database 166 at block 306. The customer profile 162a is used to identify products which match the customer's preferences at block 308 from the product data 164 stored in the products database 168. In an example, a combination of the social network data 128 received from the plurality of virtual social networks 122-124 may be used to identify products that match the customer preferences. For example, if the social network data 128 includes information from a professional social network indicating a change of job and a personal social network information indicates that the customer has a new car, then the instructions to identify and output matching products 132 may output information related to new investments as it may be deduced that the customer has extra funds available to invest as a result of the job change. It can be appreciated that one example of the combination within the social network data 128 was discussed herein and a multitude of such combinations may exist which the profiling system 100 may be configured to identify in order to output the matching products at block 310.

Figure 4:
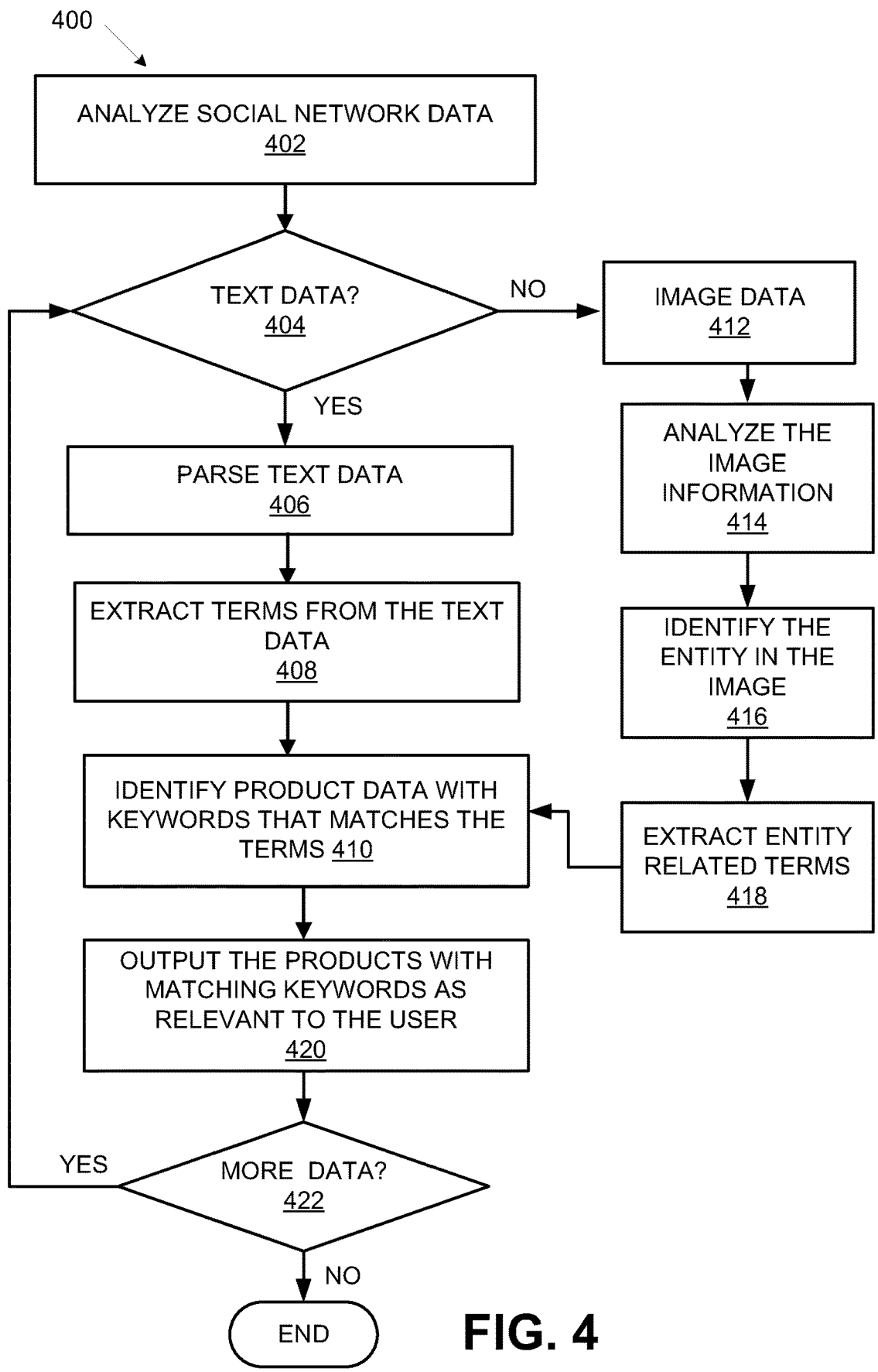
FIG. 4 is a block diagram that shows one example of a method to identify matching products.

FIG. 4 is a flow chart 400 that shows one example of a method to identify matching products. The method begins at block 402 with the processor 102 analyzing the social network data 128 to identify the type of data that was received. A plurality of data types including text and image data may be received in the social network data 128. At block 404 it is determined if text data was received within the social networking data 128. In an example, the text data identified at block 404 can be related to images such as image text, tags, comments about image sources and the like. Text analysis methods that are currently known or which are to be invented may be used to identify the text data within the social networking data 128. If it is determined at 404 that text data was received, the text data may be parsed at block 406 and the terms are extracted at block 408. In an example, the various parts of speech including nouns, pronouns, verbs and the like within the text data are identified from the parsed text after discarding the stop words and a particular part of speech such as nouns may be extracted as terms in the customer profile at block 408.

The products data 164 which matches the terms in the customer profile is identified at block 410. Again, text matching techniques may be employed in some examples for matching the terms from the customer profile to keywords included in the product information of different products in the products data 164. The products with keywords that matches the terms are identified at block 410 and are output as relevant products at block 420. At block 422, it is determined if more social network data 128 remains to be analyzed. For example, the social network data 128 may include information regarding other customers or it may include other types of data regarding the same customer that remains to be analyzed for identifying matching products. If it is determined at block 422 that more data remains to be analyzed, the process returns to block 404 to determine if the additional data is text data.

If it is determined at block 404 that the social network data includes data other than text data, the method branches to block 412 to determine that the social network data 128 includes image data. At block 414, the information associated with the image data is analyzed using intelligent image analysis algorithms. In an example, AI (artificial intelligence) can be used to train classifiers in image recognition so that they are able to distinguish and recognize various entities or elements pictured in image data at block 416. In addition, instructions may be further included in a data store 104 for mapping particular entities in the images with specific terms thereby extracting entity-related terms at block 418. The products data with keywords that matches the terms is obtained at block 410 and the information regarding the products is output on a user interface pertaining to the customer at 420. It can be appreciated that the analysis of the social network data 128 for different customers and data types is shown as occurring serially only by the way of illustration and that different types of data regarding multiple customers may be analyzed simultaneously in parallel in some examples.

Figure 5:
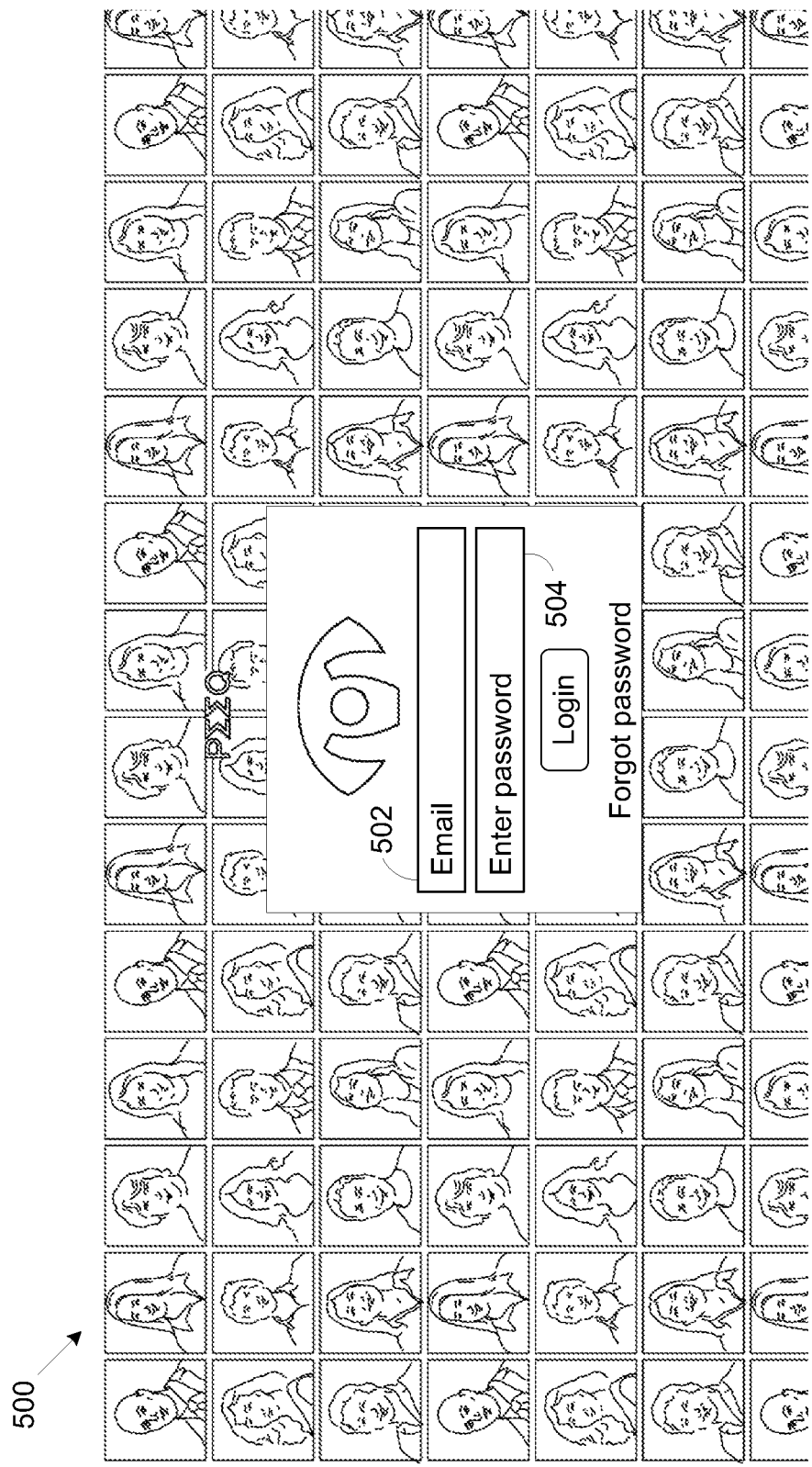
FIG. 5 is an illustration that shows an example login screen for the profiling system.

FIG. 5 shows an example of a login screen 500 for the profiling system 100. A user, for example, an employee of a financial institution can access the profiling system 100 via the login screen 500. User credentials which can include the user's email address 502 and password 504 are used to log in to the profiling system 100. Authorized users thus have access to various screens which may include updates to customer data, matching product information screen and the like. The user can provide selected information, such as information related to products that match customer profiles to the customers via the various screens as detailed herein.

Figure 6:
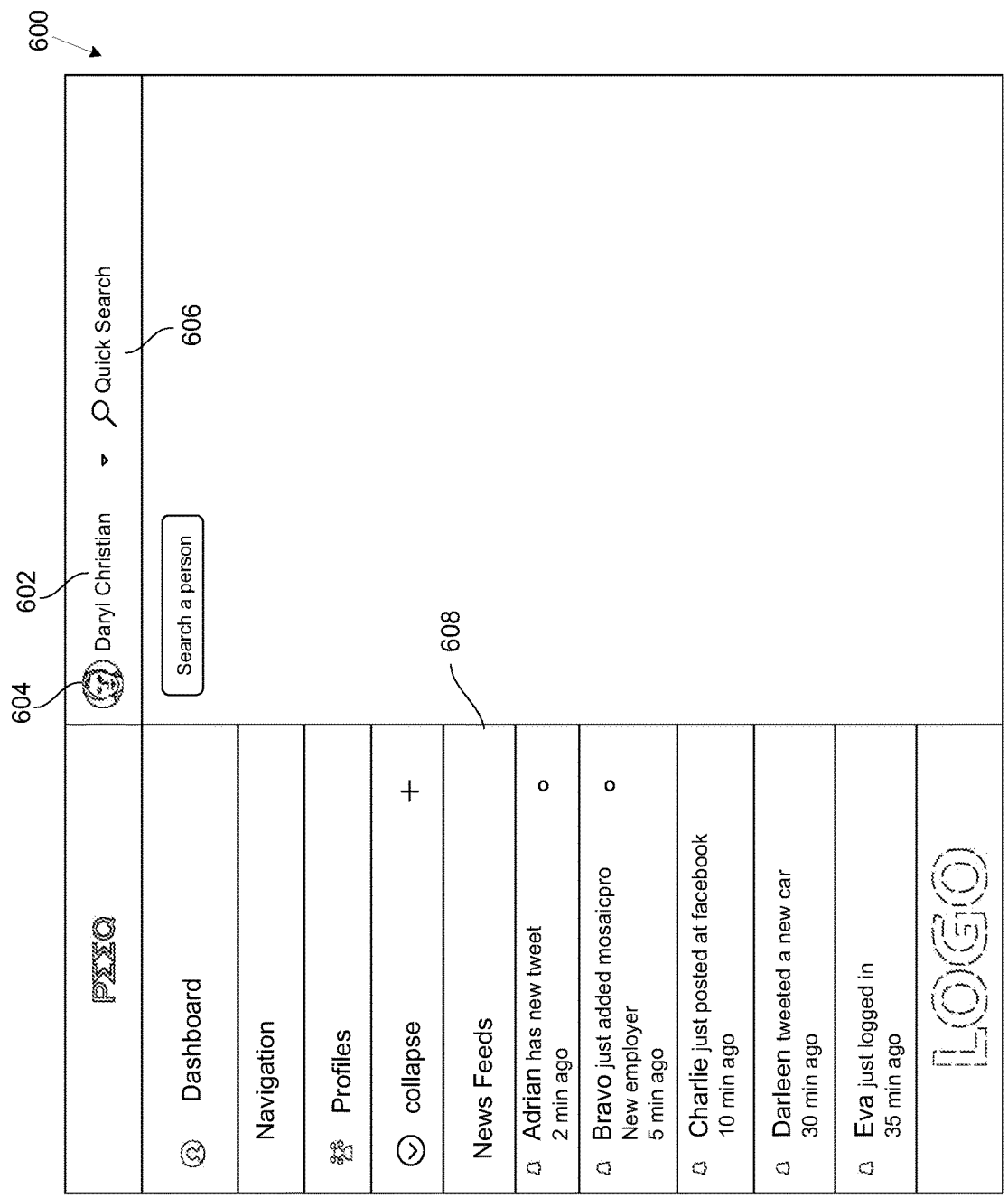
FIG. 6 is an illustration that shows an example dashboard of the profiling system.

FIG. 6 is an illustration that shows an example dashboard 600 of the profiling system 100. A user name 602 and a user image 604 are included in the dashboard 600. The dashboard 600 further includes a search box 606 that allows the user to search for particular customers via their attributes. For example, the first or last name, email address, location and other attributes may be entered into the search box 606. If more than one customer is associated within the profiles database 166 then a list of such customers is retrieved and displayed to the user. In addition, the dashboard 600 provides newsfeeds 608 regarding the customers in the profiles database 166 of the profiling system 100. The newsfeed 608 provides constant updates regarding the status and activities of the customers on the plurality of virtual social networks 122-124. For example various updates and their timings including an update regarding a new employer, a FACEBOOK post, a tweet regarding a new car and the like can be shown in the newsfeed section 608 of the dashboard.

FIG. 7 is an illustration that shows an example of a customer profile user interface 700 pertaining to the customer profile 162a that is stored by the profiling system 100 in the profiles database 166. The customer profile 162a information may include an avatar 702 and the name 704 of the customer in addition to the number of social network profiles 720 used to build the customer profile 162a and the customer's contact information 722. A delete profile from database button 706 is included to remove the customer profile from the profiles database 166, for example, upon the customer's request. The customer profile user interface 700 primarily includes three tabs, one each to display the matching products 708, the recent posts 710 and all products 712.

In FIG. 7, the matching products tab 708 is selected and the financial products which include a credit card and a housing loan that match the customer's profile 162a are displayed. A client-product analysis section 714 shows that, based on the customer profile information, the customer's interest is split equally between the credit card and the housing loan. In an example, the customer's interest may be equally distributed between a plurality of products. In another example, the extent of a customer's interest may be derived via the number of keywords from the customer's profile or the customer's social networking data that meet the product information in the products database 168. Therefore, multiple occurrences of a certain keyword in the customer's social networking data obtained across a plurality of virtual social networks 122-124 may be indicative of greater interest from the customer in a product matching the keyword. In the example shown in FIG. 7, the credit card and the car loan each match one tag as indicated at 716 and 718 and accordingly, the customer's likely interest is equally distributed between both the products. In an example, the status of a customer can be automatically matched to certain products. For example, if the customer's status in the social networking data 128 indicates that the customer is a college student or a young employee, the customer may be automatically matched to products such as credit cards, car or housing loans and the like.

Figure 8:
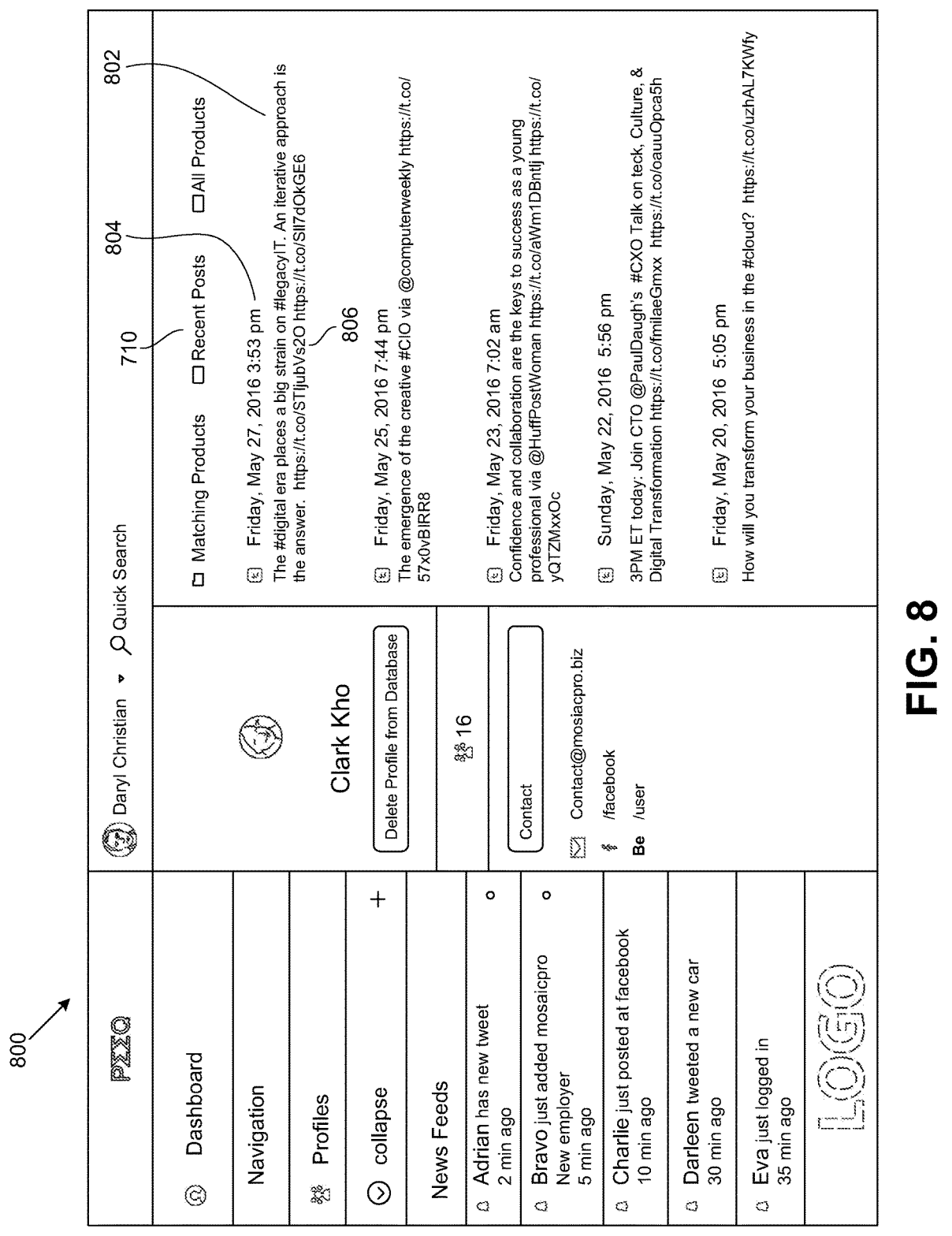

FIG. 8 is an illustration 800 that shows an example of the recent posts tab 710 of the customer profile user interface 700. Various public posts made by the customer to his/her social profiles on the various virtual social networks 122-124 are summarized under the recent posts tab 710. In an example, a title 802 and a link to the entire message 806 are included. A date 804 when the message was posted is also included in order to inform the user of the profiling system 100 of the customer's current interests. The messages posted may include original content generated by the customer or re-posting of content of interest by the customer.

Figure 9:
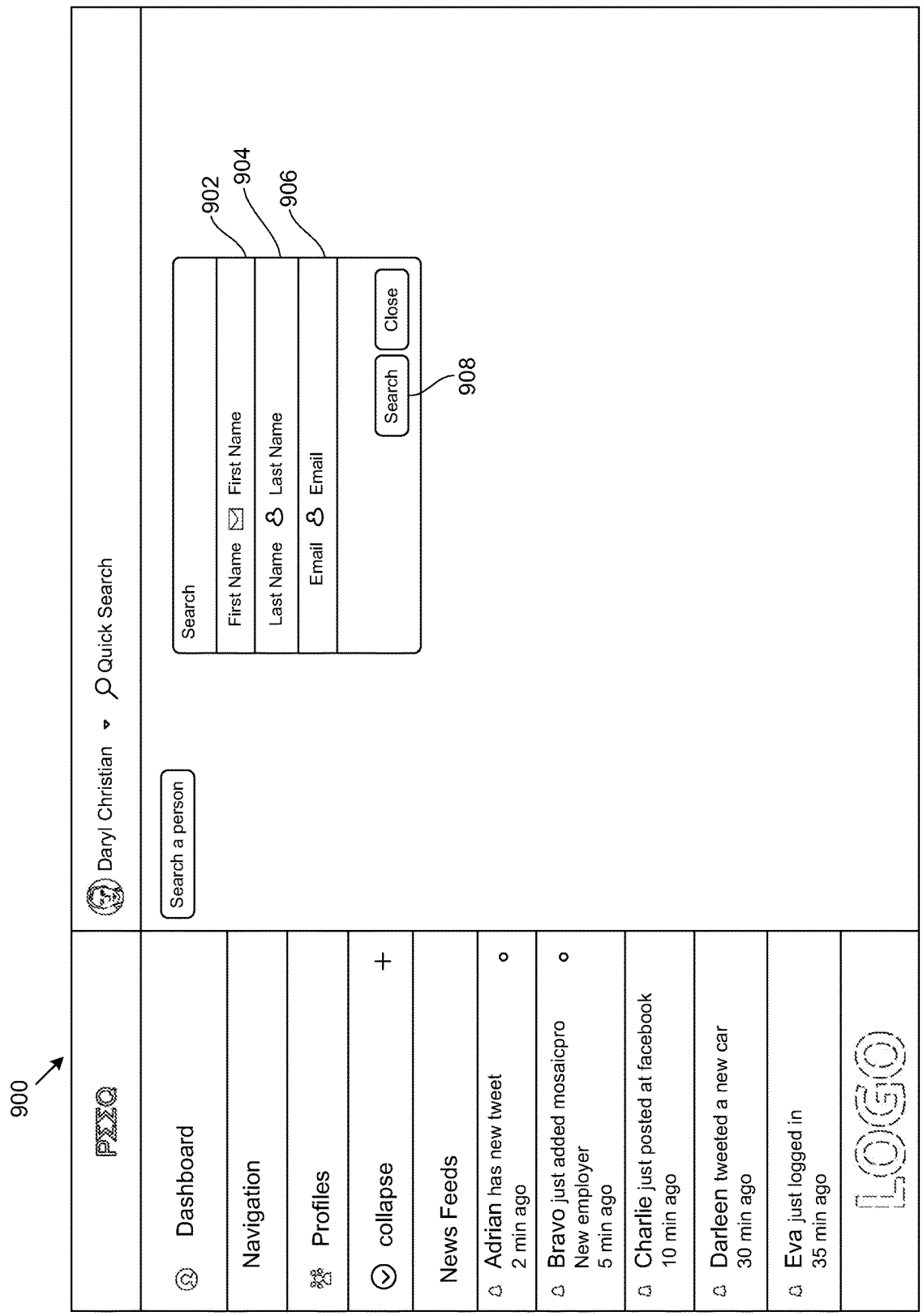
FIG. 9 is an illustration that shows an example of a search screen that allows the user to search for customer profiles within the profile database.

FIG. 9 is an illustration that shows an example of a search screen 900 that allows the user to search for customer profiles within the profile database 166. The user may enter one or more of the customer's first name, last name or email address respectively in the text boxes 902, 904, 906 to look up the customer's profile. If only one of the attributes are entered within the text boxes 902, 904 and 906 then the customer profiles that include the attribute may be retrieved, for example, via clicking the 'search' button 908.

Figure 10:
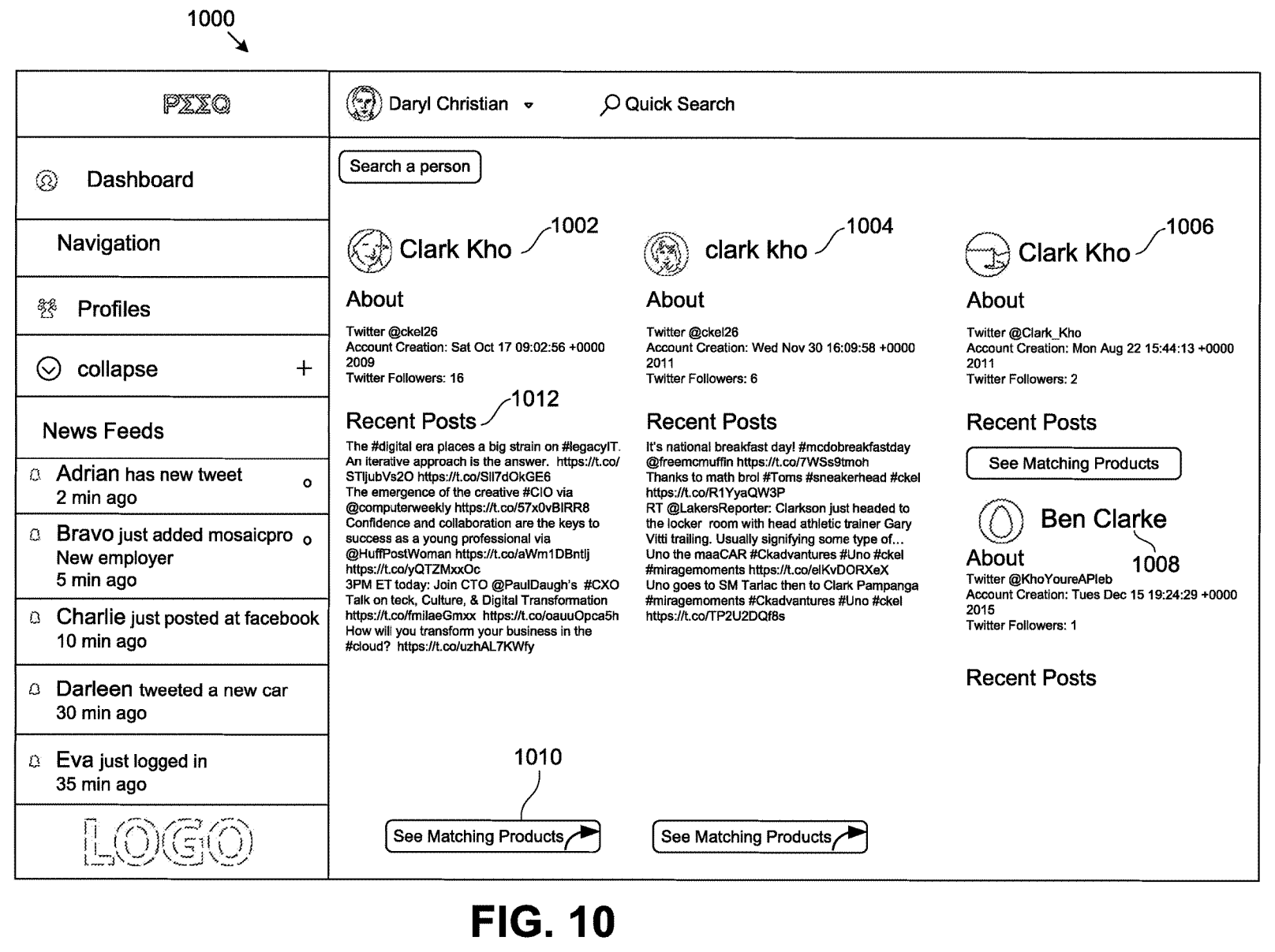

FIG. 10 is an illustration that shows an example results display 1000 of a search for a customer within the profiles database 166. In the illustrated example, a plurality of profiles 1002, 1004, 1006 and 1008 are retrieved for a search term 'Clarke' based on user accounts created on one or more of the plurality of virtual social networks 122-124. The profiles whose first or last names are 'Clarke' are retrieved in response to the search term 'Clarke'. The user of the profiling system 100 can further refine the search by selecting one of the profiles 1002-1008 for further study or analysis. Each customer profile 1002-1008 of the results display 1000 includes a section for recent posts that displays the messages or content posted within a predetermined time period, for example, a fortnight from the current date and a 'See Matching Products' button. For example, the customer profile 1002 includes the recent posts section 1012 and the 'See Matching Products' button 1010 that retrieves the products that match the profile. When the button 1010 is clicked by the user, the procedure detailed in FIG. 4 may be executed by the processor 102 and the matching products may be displayed in matching products tab 708 for the customer profile 1002 in the customer profile user interface 700.

FIG. 11 illustrates a screen 1100 that shows various customer profiles that include image data. In an example, the customer profiles screen 1100 may be generated in response to a search query run by the user via the search screen 900. Based on the images in each of the customer profiles 1102, 1104, 1106 various products from the products database 168 can be matched. For example, an image of a child 1110 in the customer's profile 1102 may be indicative of the customer's interest in products associated with children such as long term financial plans for college and the like. Similarly images of cars 1112, 1114 may indicate that the associated customers with profiles 1102, 1104 may be interested in vehicle loans. Images of holiday or tourist places 1116 may indicate that the customer may be interested in travel products such as travelers insurance or credit cards that benefit international travel, currency exchanges and the like.

Figure 12:
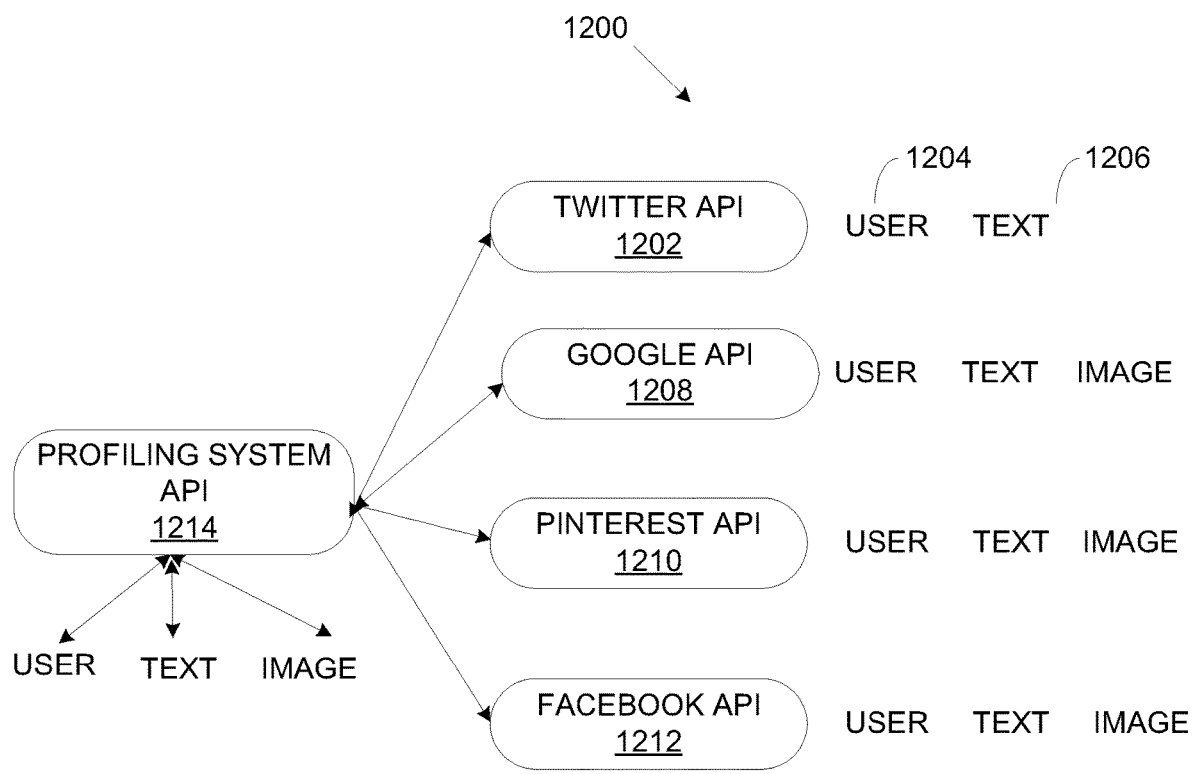
FIG. 12 is a schematic diagram of the various APIs of the plurality of virtual social networks.

FIG. 12 is a schematic diagram 1200 of the various APIs of the plurality of virtual social networks 122-124 that the profiling system 100 employs in order to aggregate the social network data 128. Different virtual social networks employ different kinds of APIs which are configured with different coding requirements to access various data types. For example, TWITTER APIs 1202 can provide information regarding a customer's attributes 1204 and text data 1206 shared by the customer who uses TWITTER. As TWITTER does not allow its users to exchange audio, image or video data the TWITTER APIs 1202 may not be configured to handle such data types. However, other virtual social networks such as GOOGLE, FACEBOOK and PINTEREST allow users to share image data in addition to text data type and hence their respective APIs 1208, 1210 and 1212 are configured for text and image data. The profiling system APIs 1214 interact with each of the TWITTER APIs 1202, GOOGLE APIs 1208, FACEBOOK APIs 1210 and PINTEREST APIs 1212 in order to collect the social network data 128 which includes both the customer attributes 1204 such as the customer's real name or the customer's user ID on one or more of the virtual social networks 122-124 and data 1206 shared by the customer in order to generate the customer profiles 162.

It can be appreciated that only APIs of certain virtual social networks are discussed herein by the way of example for brevity. However, APIs of other social networks such as but not limited to INSTAGRAM, WECHAT, VIBER, WHATSAPP, LINKEDIN and the like which allow transmission of various types of data between customers may also be used to build the customer profiles to identify matching products in accordance with examples described herein.

FIG. 13 illustrates a computer system 1300 that may be used to implement one or more of the profiling system 100 or a user device 152, 154. More particularly, computing machines such as desktops, laptops, smartphones, tablets, wearables which may be used to record, transmit, compute values for and receive dynamic coupons may have the structure of the computer system 1300. The computer system 1300 may include additional components not shown and that some of the components described may be removed and/or modified.

The computer system 1300 includes processor(s) 1302, such as a central processing unit, ASIC or other type of processing circuit, input/output devices 1312, such as a display, mouse keyboard, etc., a network interface 1304, such as a Local Area Network (LAN), a wireless LAN, a 3G or 4G mobile WAN or a WiMax WAN, and a computer-readable medium 1306. Each of these components may be operatively coupled to a bus 1308. The computer-readable storage medium 1306 may be any suitable medium which participates in providing instructions to the processor(s) 1302 for execution. For example, the computer readable medium 1306 may be non-transitory or non-volatile medium, such as a magnetic disk or solid-state non-volatile memory or volatile medium such as RAM. The instructions or modules stored on the computer readable medium 1306 may include machine readable instructions 1364 executed by the processor(s) 1302 to perform the methods and functions for the profiling system 100 described herein. For example, the processor(s) 1302 may correspond to the processor 102 while the computer readable medium 1306 corresponds to the data store 104. The computer readable medium 1306 may also store an operating system 1362, such as MAC OS, MS WINDOWS, UNIX, or LINUX. The operating system 1362 may be multi-user, multiprocessing, multitasking, multithreading, real-time and the like. For example, during runtime, the operating system 1362 is running and the social network data processing and profiling instructions 1364 are executed by the processor(s) 1302. The computer system 1300 additionally includes one or more data store(s) 1310 which corresponds to one or more of the profiles database 166 or the products database 168.

The network interface 1304 connects the computer system 1300 to internal systems for example, via a LAN. Also, the network interface 1304 may connect the computer system 1300 to a network 108 such as the Internet. For example, the computer system 1300 may connect to web browsers and other external applications and systems via the network interface 1304.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. A social network data processing and profiling system comprising:
    a processor; and
        a non-transitory data storage comprising machine-readable instructions that cause the processor to:
        access, via profiling Application Programming Interfaces (APIs) of the profiling system, respective APIs of a plurality of virtual social networks; and
        receive social network data regarding a plurality of customers posted to the plurality of virtual social networks via the respective APIs, the social network data comprising a plurality of data types;
        identify respective customer profiles of the plurality of customers in a profile database, the customer profiles comprising at least information regarding the plurality of customers received from respective social network profiles of the plurality of customers on the plurality of virtual social networks;
        automatically update the respective customer profiles with the social network data received via the respective APIs;
        extract terms from the respective customer profiles, the terms associated with the plurality of data types;
        match the extracted terms with products data stored in a products database;
        automatically identify one or more products from the products database for recommending to the plurality of customers based on the matches;
        output the identified products on a products pages associated with the plurality of customers;
        provide a plurality of respective newsfeeds to an authorized user of the profiling system, wherein the authorized user is disparate from the plurality of customers, the plurality of newsfeeds include respective constant updates of the social network data of the plurality of customers obtained from the plurality of virtual social networks; and
        enable display of the respective newsfeeds to the authorized user via a user interface associated with the profiling system.

2. The social network data processing and profiling system of claim 1, wherein the instructions to receive social network data regarding the customer further comprise instructions that cause the processor to:
    receive changes made to a respective social network profile of at least one of the plurality of customers on one or more of the plurality of virtual social networks.

3. The social network data processing and profiling system of claim 2, wherein the plurality of data types comprise image data and text data included in the social network profile of the customer.

4. The social network data processing and profiling system of claim 2, wherein the instructions to match the extracted terms with the products data further comprises instructions that cause the processor to:
    access keywords associated with the products in the products database; and
    match the keywords of the products with the terms extracted from the customer profile in the profiles database.

5. The social network data processing and profiling system of claim 4, wherein the instructions to match the keywords with terms from the customer profile further comprise instructions that cause the processor to:
    match the keywords with image tags comprised in the customer profile.

6. The social network data processing and profiling system of claim 4, wherein the instructions to match the keywords with terms from the social network profile further comprise instructions that cause the processor to:
    obtain, using textual analysis techniques on image tags and comments associated with the images, terms that represent the entity from the image; and
    match the keywords with the terms that represent the entity from the image in the customer profile.

7. The social network data processing and profiling system of claim 1, wherein the products are financial products.

8. A method for social network data processing and profiling comprising:
    accessing, by a processor using profiling Application Programming Interfaces (APIs), respective APIs of a plurality of virtual social networks;
    receiving via the respective APIs, by the processor, attributes and social network data related a plurality of customers who maintain respective social network profiles on a plurality of virtual social networks, the social network data comprising customer identification data associated with the social network profiles;
    generating, by the processor, respective customer profiles for the plurality of customers on a profiles database from the attributes, the customer profiles comprising the customer identification data;
    identifying, by the processor, products from a products database that match the customer profiles;
    causing, by the processor, a display of the matching products on products pages associated with the customer profiles;
    receiving via the respective APIs, by the processor, updates to the social network profiles of the customers on the plurality of virtual social networks;
    automatically updating the respective customer profiles with the social network data received via the respective APIs;
    altering, by the processor, the matching products displayed on the user interface associated with the customer profile based on the updates;
    providing a plurality of respective newsfeeds to an authorized user of the profiling system wherein the authorized user is disparate from the plurality of customers, the plurality of respective newsfeeds include respective constant updates of the social network data of the plurality of customers obtained from the plurality of virtual social networks; and
    enabling display of the respective newsfeeds to the authorized user via a user interface associated with the profiling system.

9. The method of claim 8, wherein identifying products from the products database that match the customer profile further comprises:
    extracting, by the processor, terms from the customer profile.

10. The method of claim 9, wherein the social network data comprises image data and extracting the terms from the customer profile further comprises:

extracting, by the processor, image tags associated with the image data as the terms from the customer profile.

11. The method of claim 9, wherein the social network data comprises image data and extracting the terms from the customer profile further comprises:

obtaining, using textual analysis techniques on image tags and comments associated with the images, terms that represent the entity from the image; and storing, by the processor, the entities from the image data as the terms extracted from the customer profile.

12. The method of claim 9, wherein identifying products from the products database that match the customer profile further comprises:

matching, by the processor, the products with keywords that match the terms extracted from the customer profiles.

13. The method of claim 8, wherein causing the display of the matching products on the user interface further comprises:

calculating, by the processor, an extent of customer interest of each of the plurality of customers in the matching products, the extent of customer interest being calculated based on a number of keywords from the social network data of each customer of the plurality of customers that match product information; and causing, by the processor, a graphic indicative of the extent of customer interest of the customer in the matching products to be displayed on the user interface.

14. The method of claim 8, wherein receiving social network data regarding the customer further comprise instructions that cause the processor to:

receiving, by the processor, image data and text data included in the social network profile of the customer.

15. A non-transitory computer-readable storage medium comprising machine-readable instructions that cause a processor to:

access, via Application Programming Interfaces (APIs) of the profiling system, respective APIs of a plurality of virtual social networks;

receive social network data regarding a plurality of customers from a plurality of virtual social networks via the respective APIs, the social network data comprising a plurality of data types;

identify respective customer profiles of the plurality of customers in a profile database, the customer profiles comprising at least information regarding the plurality of customers received from respective social network profiles of the plurality of customers on the plurality of virtual social networks;

automatically update the respective customer profiles with the social network data received via the respective APIs;

extract terms from the customer profile, the terms associated with the plurality of data types;

match the extracted terms with products data stored in a products database;

identify one or more products from the products database for recommending to the plurality of customers based on the matches; and output the identified products on a products page associated with the customer;

provide a plurality of respective newsfeeds to an authorized user of the profiling system wherein the authorized user is disparate from the plurality of customers, the plurality of respective newsfeeds include respective constant updates of the social network data of the plurality of customers obtained from the plurality of virtual social networks; and enable display of the plurality of respective newsfeeds to the authorized user via a user interface associated with the profiling system.

16. The computer-readable storage medium of claim 15 further comprising instructions that cause the processor to:

calculating an extent of customer interest of each of the plurality of customers in the matching products, the extent of customer interest being calculated based on number of keywords from the social network data of each customer of the plurality of customers that match product information; and causing, by the processor, a button to be displayed on a user interface of the profiling system wherein, the button when pressed, displays the matching products for the customer on the user interface.

* * * * *